(12) United States Patent
Prasad et al.

(10) Patent No.: US 8,255,384 B2
(45) Date of Patent: Aug. 28, 2012

(54) CLIENT-TIER VALIDATION OF DYNAMIC WEB APPLICATIONS

(75) Inventors: Mukul R. Prasad, San Jose, CA (US); Sreeranga P. Rajan, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/571,374

(22) Filed: Sep. 30, 2009

(65) Prior Publication Data

US 2011/0078556 A1    Mar. 31, 2011

(51) Int. Cl.
*G06F 7/00* (2006.01)
(52) U.S. Cl. .......................... 707/709; 715/861
(58) Field of Classification Search .................. 707/709; 715/237, 726, 861
See application file for complete search history.

(56) References Cited

U.S. PATENT DOCUMENTS

| | | | | |
|---|---|---|---|---|
| 2008/0127097 | A1* | 5/2008 | Zhao et al. | 717/124 |
| 2008/0313611 | A1* | 12/2008 | Linville et al. | 717/115 |
| 2009/0100345 | A1* | 4/2009 | Miller | 715/738 |

FOREIGN PATENT DOCUMENTS

WO    WO 2006/058075    6/2006

OTHER PUBLICATIONS

Ajax.org—The Real-Time Collaborative Application Platform Downloads Create a Custom Build, http://www.ajax.org/, downloaded May 26, 2010.
Ajax.org—The Real-Time Collaborative Application Platform Server-Side JavaScript and more . . . , http://www.ajax.org/, downloaded May 26, 2010.
Ajax.org—The Real-Time Collaborative Application Platform V3.0 Beta 2 (Unstble), http://www.ajax.org/, downloaded May 26, 2010.
Ajax.org—The Real-Time Collaborative Application Platform Validation, http://www.ajax.org/, downloaded May 26, 2010.
The Real-Time Collaborative Application Platform Ajax.Org Markup Language, http://www.ajax.org/, downloaded May 26, 2010.
The Real-Time Collaborative Application Platform Manual—Introduction, http://www.ajax.org/, downloaded May 26, 2010.
The Real-Time Collaborative Application Platform Ajax.Org Documentation, http://www.ajax.org/, downloaded May 26, 2010.
WIPO; *International Search Report and The Written Opinion*, Nov. 26, 2010.

* cited by examiner

*Primary Examiner* — Amy Ng
(74) *Attorney, Agent, or Firm* — Baker Botts L.L.P.

(57) ABSTRACT

In one embodiment, a method includes accessing and crawling a dynamic web application that comprises a client tier. In one embodiment, the crawling includes one or more instances of guided crawling that each initiate when a preceding instance of automatic crawling reaches a state in the dynamic web application that meets one or more predetermined criteria for the instance of guided crawling and, when initiated, perform one or more predetermined actions with respect to the dynamic web application. The method further includes generating, based on the crawling, a screen transition model of the dynamic web application. In a particular embodiment, the screen transition model includes a hierarchical finite state machine (FSM). In one embodiment, after the generation of the screen transition model has completed, the method further includes performing model checking on the screen transition model to validate the client tier of the dynamic web application.

20 Claims, 5 Drawing Sheets

CLIENT-TIER VALIDATION OF DYNAMIC WEB APPLICATIONS

TECHNICAL FIELD

The present disclosure generally relates to validation, and more particularly to validating dynamic web applications.

BACKGROUND

Conventional techniques for the functional validation (or verification) of web applications typically involve the use of capture-replay tools such as Selenium, WebKing, and Sahi. Using these frameworks, a user desiring to validate a particular web application manually exercises the application through various test scenarios, one test scenario at a time. The actions taken by the user while exercising the application are recorded by the tool at, for example, a Hyper Text Markup Language (HTML) Document Object Model (DOM) level and can be replayed back at a later time, usually with user-defined assertions regarding expected behavior, inserted at various steps. This technique of validation, however, requires a substantial amount of manual effort. While frameworks such as JsUnit can be used to perform unit testing of the JavaScript code in the application, this manner of testing is by its very nature very localized, language specific, and also manually intensive.

Another validation technique involves reverse engineering a model of a desktop graphical user interface (GUI) application with the objective of generating test cases. However, while desktop GUI applications may share some of the rich user-interface and interactivity of modern dynamic web applications, modern dynamic web applications have other features such as, for example, synchronous client-server communication and a DOM-based user interface, which are not shared or present in conventional desktop GUI applications. Furthermore, these and other conventional techniques remain increasingly ill-suited for increasingly dynamic web applications, particularly those web applications utilizing asynchronous techniques such as Asynchronous JavaScript and XML (AJAX). Still other validation techniques for web applications generally propose testing of web applications by representing relevant behavior through some kind of state-based model and then checking the model using various conventional techniques. Such approaches specify the model manually and are generally geared towards traditional, static, and/or non-user interactive web applications. Furthermore, these approaches typically involve generating test traces from the model and then checking these traces one at a time.

DESCRIPTION OF EXAMPLE EMBODIMENTS

Figure 1:
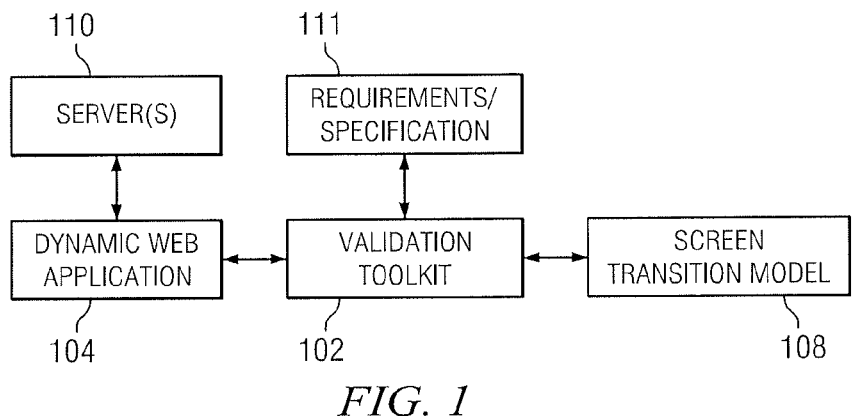
FIG. 1 illustrates an example environment of an example validation toolkit.

Particular embodiments relate to validating web applications. Particular embodiments relate to validating dynamic web applications that may include JAVA or other software platforms and that may be configured to display web pages that include Hyper Text Markup Language (HTML) content, Extensible Markup Language (XML) content, JavaScript resources, and/or other embedded resources. Particular embodiments relate to validating dynamic web applications that are configured to utilize asynchronous techniques such as, by way of example, Asynchronous JavaScript and XML (AJAX). Particular embodiments generate a behavior model of a dynamic web application in the form of a screen transition diagram or model. In particular embodiments, the screen transition model is formatted in XML. In particular embodiments, the screen transition model includes a hierarchical finite state machine (FSM). In particular embodiments, the screen transition model is generated as a result of guided crawling of the deployed dynamic web application. In particular embodiments, the crawling involves both instances of fully automatic crawling as well as at least one instance of guided "custom" crawling. In particular embodiments, model checking is used to validate the screen transition model after generation of the screen transition model is completed, hence enabling validation of global properties of the model. Particular embodiments are concerned with validating the client tier of the dynamic web application.

As described above, particular embodiments relate to validating dynamic web applications. By way of example, such dynamic web applications may generally be characterized by feature-rich, client-side user interfaces and typically support a high degree of user interactivity. By way of example, technologies such as AJAX and Adobe Flash may be utilized to enable such features of these dynamic web applications. As is also mentioned above, particular embodiments focus on validating the behavior of the client-tier of the web application. By way of example, the client-tier of a web application generally refers to the portion of the code for implementing the web application that resides and executes within or at the end-user's machine (or client device). Typically, a web application executes in the context of a web browser (e.g., Microsoft Windows Internet Explorer, Mozilla Firefox, Apple Safari, Google Chrome, and Opera, etc.) that consumes content over a network and renders the content on a display of the end-user's machine.

Generally, a web application is an application that may be accessed via a web browser or other client application over a network, or a computer software application that is coded in a web browser-supported language and sometimes reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications may often require access to additional resources associated with other applications.

A web application deployed at an end-user's machine may cause a web page to be rendered on a display of the end-user's machine. Web applications that execute in conjunction with or in the context of a web browser may cause the web browser to render a web page on the display. Web pages of web applications typically include embedded links to other web pages of the web application as well as to web pages and web sites external to or not affiliated with the web application. Dynamic web applications in particular often include a plurality of embedded links which may be rendered on the currently viewed web page as a hyperlink, icon, or other "clickable" feature. Typical dynamic web applications may include one or more resources. A web page or resource for rendering a web page, which may themselves include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and JAVA, among others. By way of example, HTML enables an application or web page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client device, the web browser interprets and displays the pages and associated resources received or retrieved from the web application or website hosting the web page, as well as, potentially, resources from other websites.

JavaScript is an example of a scripting language that enables various web applications to access resources within other applications for use on the client side of a user session to enable an interactive or dynamic user session when accessing a dynamic web application. AJAX (shorthand for Asynchronous JavaScript and XML) refers to a group of interrelated techniques used on the client side of a user session to enable more interactive and rich web applications. Utilizing JavaScript or AJAX, a web application can transmit requests for resources to backend servers associated with the web application or to other external resource providers in order to retrieve the resources asynchronously in the background operations of the end-user's machine without necessarily interfering with the display and behavior of the currently-rendered page. More particularly, when using AJAX, resources are usually retrieved by transmitting an XMLHttpRequest (XHR) object to the resource provider. An XHR is a document object model (DOM) application programming interface (API) that can be used with a web browser scripting language (e.g., JavaScript) to send, for example, an HTTP or HTTPS request for a resource directly to a web server and load the resource retrieved from the server in response to the request directly back into the scripting language code. Once the resource is within the code, the resource may then be available as, by way of example, an HTML or XML document or plain text. In this manner, the retrieved resource may be used to manipulate the currently active document rendered by the web browser without requiring the client to load a new webpage document. In some example embodiments, if the resource is retrieved as plain text, the plain text may be formatted in JavaScript Object Notation (JSON) by the server and evaluated within JavaScript to create an object of data for use on the current DOM.

FIG. 1 illustrates an example environment 100 of a validation toolkit 102. Validation toolkit 102 may be executed within or operate within one or more computer systems as described in more detail below with reference to FIG. 5. In particular embodiments, dynamic web application 104 is deployed at the same computer system(s) as validation toolkit 102. In an alternate embodiment, dynamic web application 104 is deployed at a separate computer system that is connected or coupled with the computer system(s) hosting validation toolkit 102. As described above, particular embodiments implement a two-part approach to validating dynamic web application 104. In the first part (or stage), validation toolkit 102 extracts or generates a behavioral model 108 of the client-tier of dynamic web application 104 as the dynamic web application is deployed and running/executing at the computer system. While dynamic web application 104 is running and validation toolkit 102 is concurrently generating the behavioral model 108, dynamic web application 104 may periodically communicate (e.g., via AJAX) with one or more backend servers 110 that may host the remaining code and other resources for implementing dynamic web application 104.

In particular embodiments, the behavioral model 108 generated by validation toolkit 102 is a screen transition model (behavioral model and screen transition model may be used interchangeably herein and may both be designated by the reference number 108). Additionally, in particular embodiments, screen transition model 108 takes the form of or is generated in the form of a finite state machine (FSM), and even more particularly, a hierarchical FSM. A hierarchical FSM is generally a FSM in which each of one or more nodes or states of the FSM is, in turn, a FSM. An example hierarchical FSM is illustrated by way of reference in FIG. 6. An example graphical representation of an example screen transition diagram is illustrated by way of reference in FIG. 7.

Figure 2:
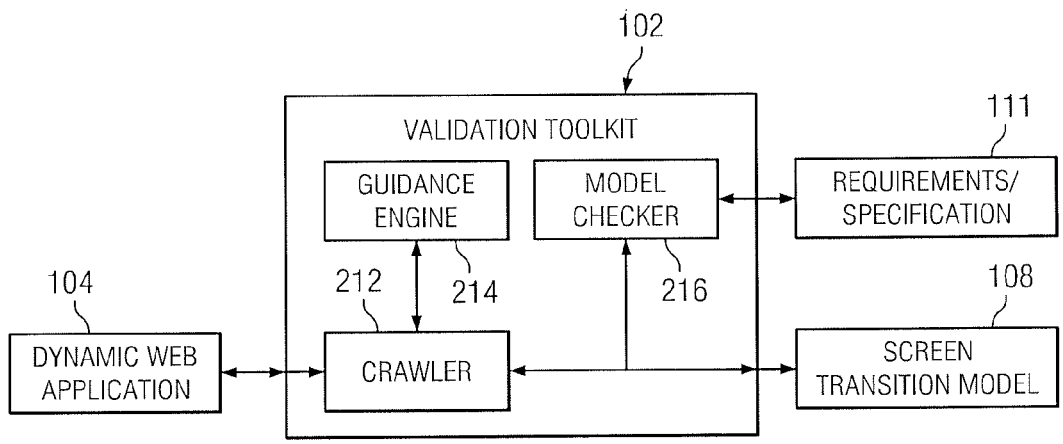
FIG. 2 illustrates an example validation toolkit.

In particular embodiments, validation toolkit 102 includes a crawler 212 that dynamically, automatically, and comprehensively navigates and exercises the dynamic web application 104 under test through a process the present inventors refer to as guided crawling. As illustrated in FIG. 2, crawler 212 may receive input such as guidance instructions, parameters, and other information from a guidance engine 214 for use by crawler 212 in crawling dynamic web application 104, as will be described in more detail below. An output of crawler 212, namely screen transitional model 108, is a compact mathematical model or representation of the behavior of dynamic web application 104 and, in particular embodiments, the client-tier of dynamic web application 104. In one embodiment, screen transition model 108 is formatted in XML and subsequently stored as an XML document or file by validation toolkit 102.

In the second part (or stage), validation toolkit 102 checks, verifies, and/or validates interesting properties, and particularly global properties, of the screen transition model 108. In particular embodiments, validation toolkit 102 includes a model checker 216 that receives as input the screen transition model 108 generated by crawler 212 and performs model checking on or of the screen transition model 108 in order to validate the client-tier of the dynamic web application 104, as will be described in more detail below (Note that in some alternate embodiments, model checker 216 may be separate from validation toolkit 102 and crawler 212). In a particular embodiment, model checker 216 receives as input a specification or set of requirements 111. Model checker 216 may then test, automatically, whether or not screen transition model 108 satisfies the specification. By way of example, model checker 216 may determine whether or not screen transition model 108 satisfies one or more functional properties of dynamic web application 104 as specified in specification 111. As another example, model checker 216 may determine whether or not screen transition model 108 satisfies one or more navigational properties related to the usability of dynamic web application 104 as specified in specification 111. In particular embodiments, model checker 216 performs model checking and validation after screen transition model 108 has been generated/completed in its entirely. That is, in particular embodiments, generating the screen transition model 108 is not concurrent with or doesn't overlap the checking of the screen transition model 108. In an alternate embodiment, the generating and checking may be concurrent or portions of the checking may overlap portions of the generating.

Figure 3:
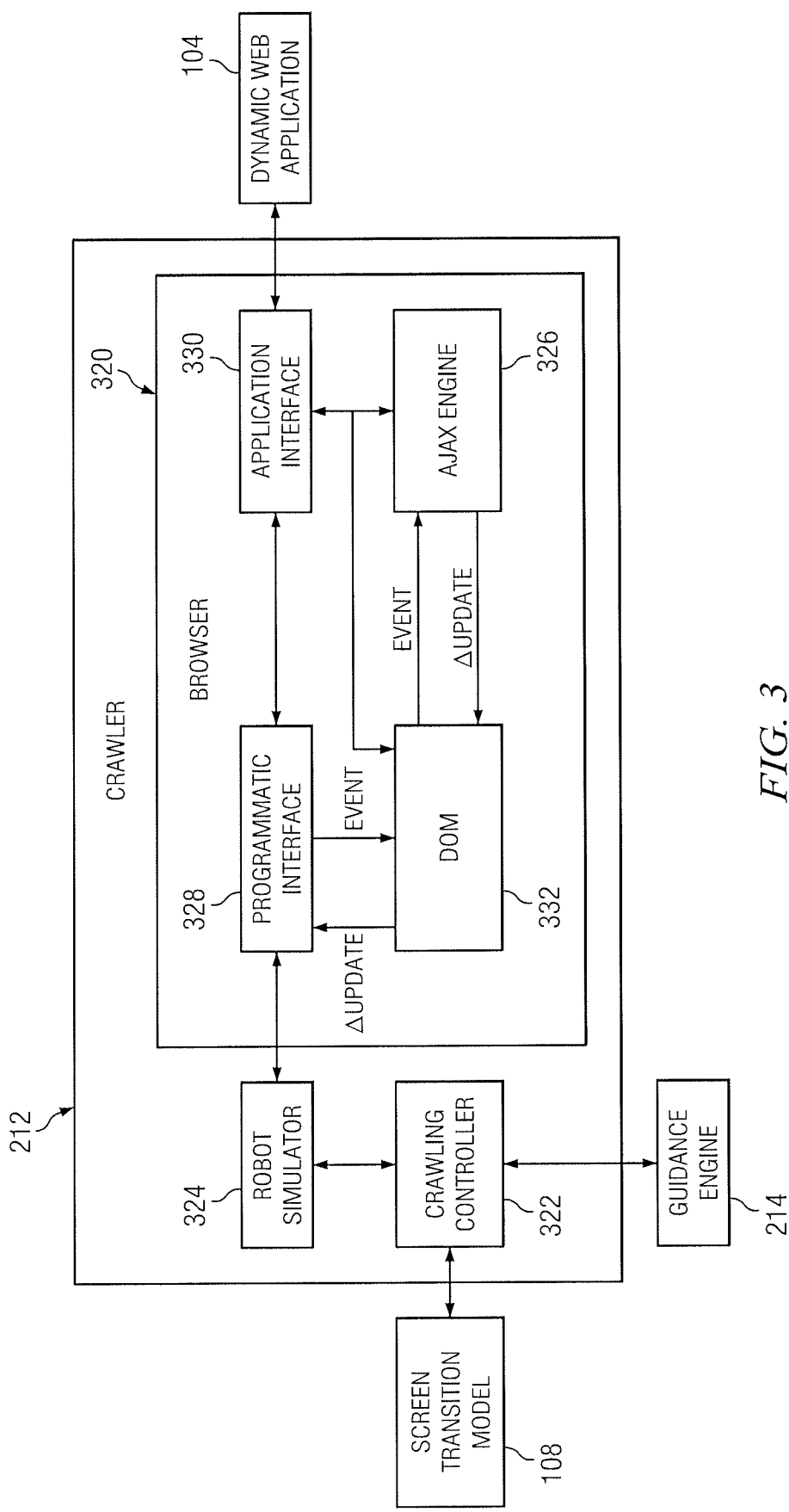
FIG. 3 illustrates an example crawler.

In particular embodiments, and as illustrated in FIG. 3, crawler 212 includes a browser 320, crawling controller 322, and robot simulator 324. In some embodiments, browser 320, in some respects, is similar to a convention web browser. In a particular embodiment, browser 320 receives content and other information for rendering a web page from dynamic web application 104 through application interface 330 and translates the web page into a DOM representation (e.g., a DOM hierarchical tree) 332. In some embodiments, browser 320 may include its own AJAX engine 326 for aiding application interface 330 in constructing DOM 332 and for asynchronously updating the DOM representation 332 of the current web page. In the illustrated embodiment, a programmatic interface 328 also interacts with DOM 332. By way of example, programmatic interface 328 passes event information to DOM 332 and receives updates based on DOM 332. In a particular embodiment, programmatic interface 328 is coded in JAVA or is JAVA-based. Programmatic interface 328, in turn, is coupled to robot simulator 324, which is, in turn, coupled to crawling controller 322. In particular embodiments, programmatic interface 328 enables robot simulator 324, and through it crawling controller 322, to interact/communicate with the dynamic web application via browser 320. In an example embodiment, programmatic interface 328 receives input (such as, for example, mouse clicks, keyboard character input, etc.) from robot simulator 324 (at the direction of crawling controller 322) and supplies this input to dynamic web application 104 via application interface 330. Additionally, programmatic interface 328 receives output (such as querying the state of various DOM elements within the current DOM 332 constructed via application interface 330 and AJAX engine 326, and pass this output to robot simulator 324 for subsequent routing to crawling controller 322 (or, alternately, directly to crawling controller 322). In an example embodiment, crawling controller 322 may be or be similar to the crawljax controller developed by the Technical University, Delft.

In particular embodiments, upon navigating to a new web page from a previous web page for which a previous DOM has been generated by browser 320, browser 320, rather than discard the previous DOM and construct a new DOM for the new web page, modifies the previous DOM to incorporate the differences between the previous and new web pages using new content and resources retrieved via dynamic web application 104 for rendering the new web page. Additionally, in particular embodiments, the differences between adjacently navigated web pages are stored and used to generate screen transition model 108, as opposed to storing each DOM/state and generating a behavioral model based on the entire DOMs/state themselves.

The two-part approach to validating a dynamic web application provides numerous advantages over conventional validation techniques. More particularly, the afore-described techniques of generating a behavioral model of a dynamic web application through dynamic guided crawling followed by model checking the completed and statically represented model may provide several significant advantages, some or all of which may be provided in various particular embodiments described herein. Such advantages will become more clear in the following more detailed descriptions.

In particular, guided crawling facilitates dynamic, automatic, and comprehensive exploring of a dynamic web application while reducing the amount of computing required and enabling the generation of a compact and accurate behavioral model as opposed to conventional techniques employing fully automatic crawling or manual exploration. By way of reference, crawling-based model generation is a relatively expensive step (in terms of the computing resources required including processing as well as storage) and so, in this regard, it is advantageous to limit the amount of crawling performed on a given web application. In one particular embodiment, crawler 212 crawls the dynamic web application 104 only once while the model checking by model checker 216 may be performed offline with the completed screen transition model 108 as many times as needed or desired without adversely impacting the model generation efficiency. Additionally, as all the requirements of the dynamic web application to be checked are often not known prior to checking and validating, relegating the validation of screen transition model 108 offline obviates the need to repeat the relatively expensive crawling and model generation, as opposed to conventional techniques in which the checking and validating are performed concurrently with the crawling and model generation.

Furthermore, particular embodiments generate a relatively compact screen transition model 108 (as compared to conventional techniques). By way of example, compaction results, at least in part, by discarding application-level implementation details that are not relevant from a validation perspective as well as compression that may be achieved by the specific choice of the mathematical representation of the model 108. This compaction facilitates a more efficient validation of the requirements. Still further, global properties or requirements of the screen transition model 108 are easier to check in particular embodiments. More particularly, checking/validating requirements related to the global behavior of the web application is facilitated by checking the complete screen transition model 108 as opposed to during model generation (as in conventional techniques) in which there is typically only visibility into a single trace (i.e., the current trace being crawled). Further compression and compaction may be achieved by generating screen transition model 108 based on the differences in the DOMs of adjacently navigated web pages as opposed to the complete DOMs/states themselves.

Guided crawling facilitates comprehensive, accurate, and compact model generation in other ways as well. By way of example, web applications often enable users to provide input or even require input from a user to proceed to certain web pages offered by the web application. By way of example, a web application may require some sort of user authentication, such as a login ID and/or password, in order to proceed to a next step or next web page or to enable or render certain features provided by the web application. This may require, by way of example, entering a specific, valid username and password information into specific input boxes rendered on the current web page and/or clicking a specific button, such as a login button, rendered on the current web page. Such authentication may be required at a first (e.g., "home") web page rendered with the dynamic web application. Alternately, such an authentication step may be required at a later point at a subsequent web page navigated to from a previously rendered web page (e.g., such as is the case with the checkout stage implemented by Amazon.com). In such cases, fully automatic crawling fails to proceed further and model coverage is limited. In particular embodiments, this is when the guided custom crawling takes over. Upon authentication or other information input, the crawler 212 may revert back to automatic crawling. States in which it is advantageous for crawler 212 to switch to an instance of guided custom crawling may correspond to screens/web pages in which a user is prompted to enter information, among others. Such predetermined states or criteria may be programmed into guidance engine 214 as described more fully below.

Furthermore, some web applications manifest different behaviors (e.g., privileges, features, actions, etc.) for administrators or other specially privileged users as opposed to regular users or unregistered users not having usernames and passwords. In such cases, in particular embodiments, validation toolkit 102, and particularly crawler 212, may perform more than one instance of crawling the same dynamic web application (e.g., one instance with an administrative login, one instance with a regular user login, and even one instance with no login, where applicable).

HTML forms have become more and more common in modern web applications (a user authentication panel as described above is one special instance). Using conventional techniques, typical exploration would require exploring these forms with different data sets (e.g., one erroneous data set and one valid data set) for checking the response of the application to incorrect and correct user inputs. Additionally, in many instances, practical resource constraints dictate that only specific actions on specific pages be exercised when crawling a web application. In particular embodiments, this is achieved through the guiding crawling techniques described herein by excluding from crawling and from the screen transition model 108 those features and actions that may be outside the scope of or irrelevant to the ensuing checking and validating step.

Particular embodiments account for the afore-described considerations, advantages, conventional shortcomings using guided crawling. More particularly, validation toolkit 102 provides a mechanism for specifying and executing (during crawling) a specific sequence of actions, with specific and possibly multiple sets of data, which are executed at specific stages in the evolution or navigation of dynamic web application 104; that is, at specific states corresponding to specific pages of dynamic web application 104. Thus, crawler 212 may navigate through several sequences based on the various scenarios described above. In particular embodiments, the behavior produced through this guided or "custom" crawling may be seamlessly and accurately integrated with other parts of the screen transition model 108 being generated through "blind" or fully automatic crawling (e.g., involving fully automatic link navigation).

In particular embodiments, the guidance provided to crawler 212 is in the form of guidance directives supplied to crawler 212 by guidance engine 214. These guidance directives may be specific to the particular web application under test. In an example embodiment, a guidance directive may be defined mathematically as $G=(p,A)$. In this way, the guidance directive G is an ordered pair that consists of a predicate p that is evaluated on the current web application state and an action sequence A. The action sequence $A=(\alpha_1, \alpha_2, \ldots, \alpha_k)$ is a sequence of atomic actions $\alpha_i$. Each atomic action $\alpha=(e,u,D)$ is a triple consisting of a DOM element e, a user-action u, and a set of data-instances D (potentially empty) associated with u. A guidance directive G, as per the afore-described definition, includes the predicate that determines when G should be activated. In an example embodiment, the predicate is evaluated on the current state of the web application 104 during the crawling. In particular embodiments, the state is essentially an encoded version of the DOM of the current screen/web page rendered by browser 320. The action sequence A represents the sequence of user actions that must be executed on the web application upon activation of G (i.e., when p is true in the current state/screen), along with the associated data, if applicable. Each atomic action $\alpha$ in A is a user action u (e.g., a simple browser-based user action) on a particular DOM element e on the current screen/web page. By way of example, one typical action u would be a click or mouse-over on a DOM element such as, for example, a link or button. Such actions have no corresponding data. Hence, the D component of the atomic action would be the empty set Ø. Another class of actions are those that correspond to the choice or input of some data string, for example, selecting an option from a select element or assigning a string value to an <input> HTML element, etc. In these cases, the D component would represent the set of data values for which to test/exercise the element with. Upon activation of the guidance directive, validation toolkit 102, and specifically crawling controller 322, constructs a concrete action sequence from A by picking specific data values from the set D corresponding to each $\alpha$ in A and executes it on the web application 104. In particular embodiments, validation toolkit 102 does this systematically for each combination of data values represented in A.

Two example algorithms are presented below. The first is an algorithm for performing a guide crawl on dynamic web application 104 from the initial, home, or first rendered page of dynamic web application 104. The second is an algorithm for performing a guided crawl on dynamic web application 104 from a particular state S.

```
Algorithm 1: GuidedCrawl(W,G^set)
M = Ø
InitPage ← LoadBrowser(W)
GuidedCrawlFromState(InitPage)
return M
Algorithm 2: GuidedCrawlFromState(S)
if IsVisited(S) then
    return
end if
MarkVisited(S)
AddState(S,M)
Actions ← FindActions(S)
for all G(p,A) ∈ G^set do
    if p(S) = true then
        Actions ← Actions ∪ ComputeActionSequences(A)
    end if
end for
for all α ∈ Actions do
    nextState ← Execute(α,W,S)
    AddTransition(nextState,S,M)
    GuidedCrawlFromState(nextState)
    UndoTransition(nextState,S,M)
end for
```

These algorithms represent example pseudo-code for the overall model generation algorithm based on guided crawling in accordance with particular embodiments, and are implemented in crawler 212 and, in some example embodiments, more specifically in crawling controller 322. The first and main algorithm GuidedCrawl is supplied a web application W (e.g., dynamic web application 104) and a set of associated guidance directives $G^{set}$. It initializes the navigational model, M (which will be populated by the guided crawling) loads the web application in the browser and invokes the inner procedure, GuidedCrawlFromState on the initial web page (InitPage) of the dynamic web application. GuidedCrawlFromState does the actual crawling and recursively calls itself on new successor states/screens. The various other function used in the algorithm pseudo-code are described as follows:

IsVisited: Checks if the state S has been visited by a previous invocation of Guided CrawlFromState. this check takes into account any state-abstractions implemented for this step.

MarkVisited: Marks state S as visited to exclude it from future guided crawls.

AddState: Records the state S in the navigational model M as a newly discovered state.

FindActions: Computes the set of primitive (non-guided) user actions (e.g., clicks, mouseovers, etc.) that can be executed on the current screen S.

ComputeActionSequences: Computes concrete sequences of actions from the guidance directive G by picking specific data values in its constituent atomic actions $\alpha$. Computes all possible sequences that can be created by various choices of the specified data values.

Execute: Executes the action (or action sequence) $\alpha$ on the web application W, which is currently in state/screen S.

AddTransition: Records the transition from state S to state nextState in the model M.

UndoTransition: Functionally reverses the recent transition (S→nextState) on W to restore it to state S.

The model extracted during the guided crawling primarily captures the navigational aspects of the web application's client-tier behavior. The chosen screen transition model mirrors the natural structure of a dynamic web application as well as ties in with the specific method of model generation described, that is, dynamic guided crawling. Much of the navigational behavior of modern, highly dynamic web applications is focused around changes to the browser-screen content while remaining on the same Uniform Resource Locator (URI). Thus, the afore-described methods of generated DOMs based on differences between adjacently navigated pages and modeling the behavior based on such differences work synergistically. Further, while the web application may theoretically allow for an infinite number of different screens or web pages it is neither practical nor particularly useful to attempt to capture, represent or check these infinite screens. Thus, particular embodiments focus on automatically navigating (through guided crawling) a rich but finite number of screens at each URI of the web application, while using innovative state representation and abstraction mechanisms to represent this information compactly.

Figure 6:
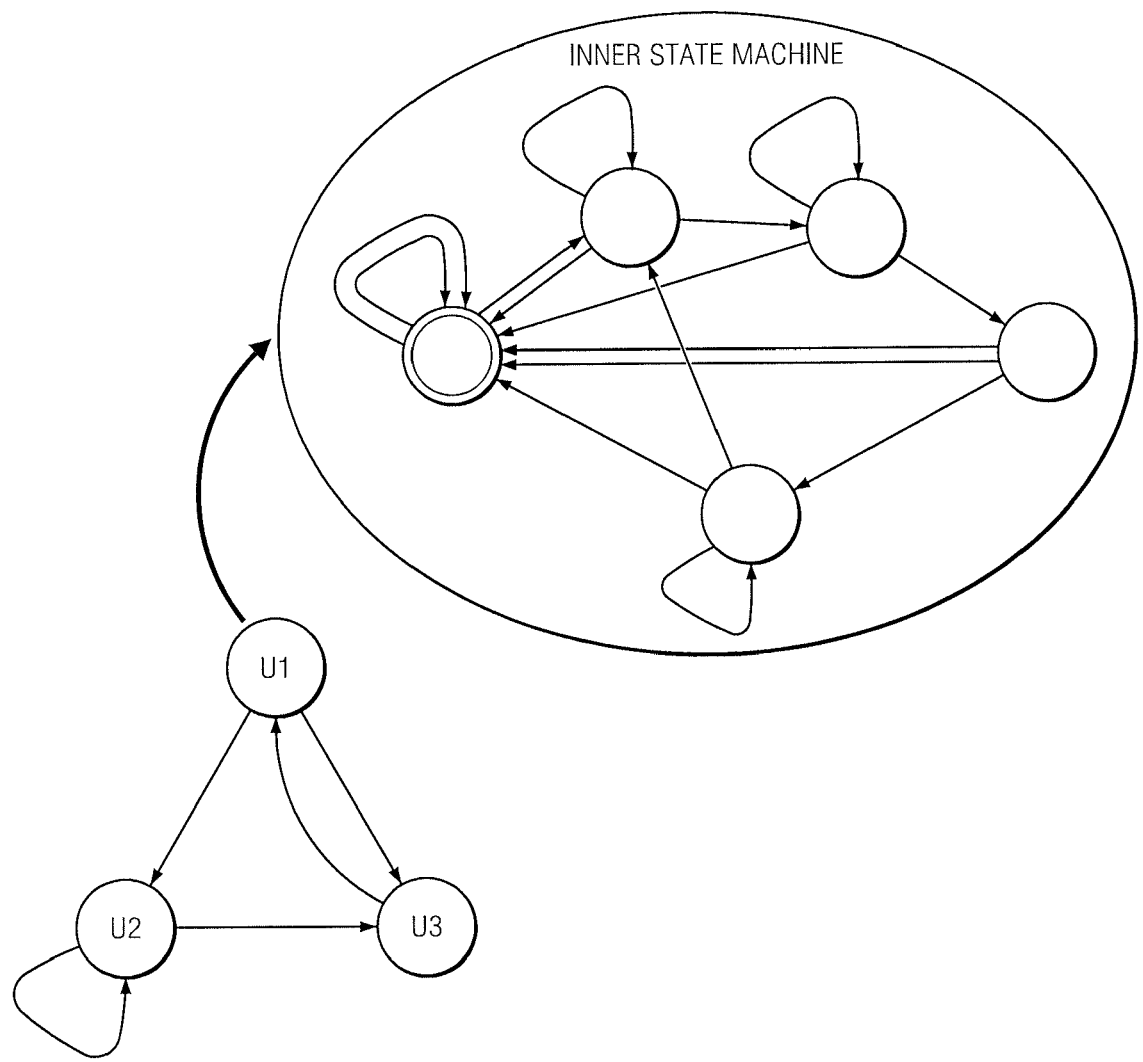
FIG. 6 illustrates an example hierarchical finite state machine.
Figure 7:
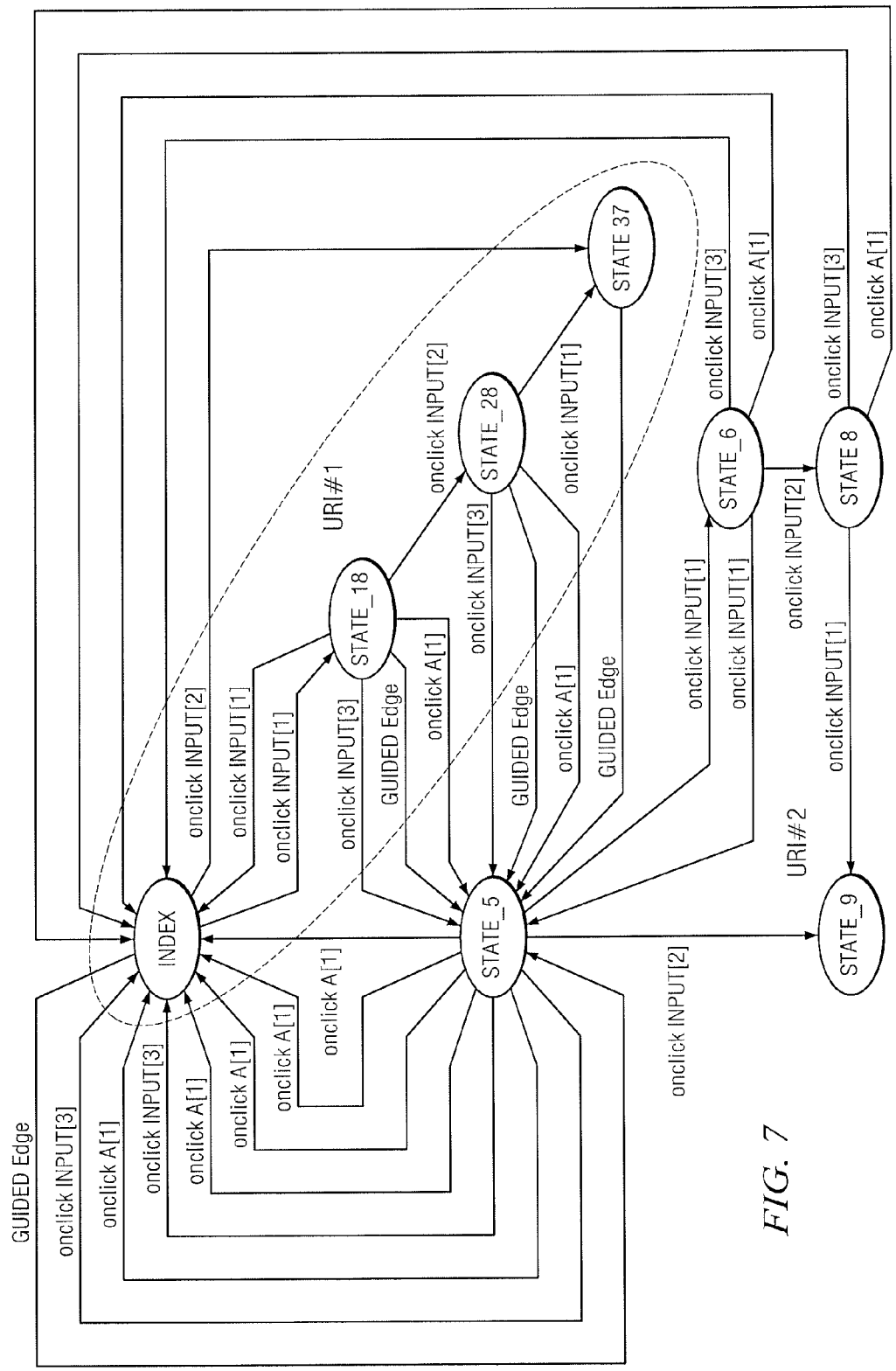
FIG. 7 illustrates an example graphical representation of an example screen transition diagram.

The screen transition model 108 may, according to particular embodiments, be summarized as follows. A state representation is used to capture the content of each web page/screen visited by the application 104 and a FSM is used to represent the navigational behavior of the web application 104 around each URI. Further, a top level FSM captures the navigation of the web application from one URI to another. Thus, such a screen transition model 108 is intrinsically a hierarchical FSM. As illustrated in FIG. 6, each U1, U2, and U3 represent a super-state encompassing the navigational behavior at a particular URI and each contains an inner FSM representing this intra-URI behavior.

In particular embodiments, XML is used to represent the screen transition model 108. There are numerous features of model 108 that are noteworthy from an efficiency and efficacy perspective. By way of example, in particular embodiments the format of the model 108 excludes any HTML CSS (cascading style sheets) information as well as information about the DOM tree hierarchy. As another example, in particular embodiments, the model 108 represents the FSM of each super-state through its transition relation, rather than the explicit representation of each screen (as described above), as it is natively available during the guided crawling. This may be particularly significant as the state changes only minimally in a single transition. Therefore, a high degree of compaction can be achieved in the model 108 by representing only the changes between successive screens rather than the whole screen state.

As described above, particular embodiments achieve compression through one or more of a variety of sources. By way of example, in particular embodiments, crawler 212 is provided a specific list of HTML elements that should definitely be included during crawling (i.e., white listing) and those that should definitely be excluded during the crawling (i.e., black listing). This specification may be done by the user on an application-specific basis, as an input to the model generation step. As another example, as there are many instances in which two "similar-looking" HTML pages result in the same state representation in the model (e.g., when two pages have an identical DOM tree and differ only in the content of the text nodes attached to various DOM elements), in particular embodiments, two such web pages are viewed as and considered the same state and hence represented as a single state in the navigational model 108, providing significant state-space reduction in the model 108. In particular embodiments, the criteria for state-equivalence are implemented as within the IsVisited( ) function in the afore-described algorithm. As another example, typically, every HTML attribute of every DOM element included in a model figures as a separate state variable in the state representation in the model. However, in many or most practical instances, attributes change values in unison as the application transitions from one screen/state to another. Thus, in particular embodiments, each state may potentially be represented with a fewer number of state variables (than one variable per HTML DOM element attribute). Hence, this observation is used in particular embodiments to perform a state re-encoding step on the generated model, using, by way of example, algorithms similar to those for FSM minimization.

The present inventors have determined that several navigational and other types of requirements that are typically checked on web applications can be quite naturally formulated as properties in temporal logic, an input language of model checkers, hence making model checking an advantageous choice to validate the described screen transition models of dynamic web applications. By way of example and not limitation, such classes of requirements include screen transition requirements, feature availability/unavailability requirements, and navigation structure/usability requirements.

Figure 4:
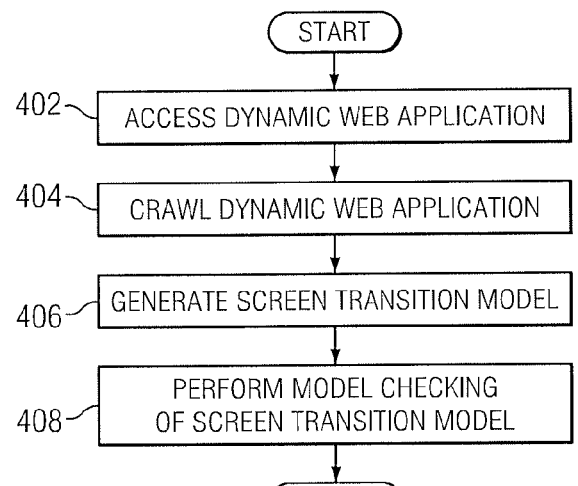
FIG. 4 illustrates an example method for validating a web application.

FIG. 4 illustrates one example method for validating the client-tier of a dynamic web application. In one embodiment, the method begins at 402 with accessing the dynamic web application during runtime of the dynamic web application. The dynamic web application is then crawled at 404. In particular embodiments, the crawling includes one or more instances of guided crawling that each initiate when a preceding instance of automatic crawling reaches a state in the dynamic web application that meets one or more predetermined criteria for the instance of guided crawling and, when initiated, perform one or more predetermined actions with respect to the dynamic web application. The method further includes generating at 406, based on the crawling, a screen transition model of the dynamic web application. In a particular embodiment, the screen transition model includes a hierarchical finite state machine (FSM). In one embodiment, after the generation of the screen transition model has completed, the method further includes performing model checking on the screen transition model at 408 to validate the client tier of the dynamic web application.

Figure 5:
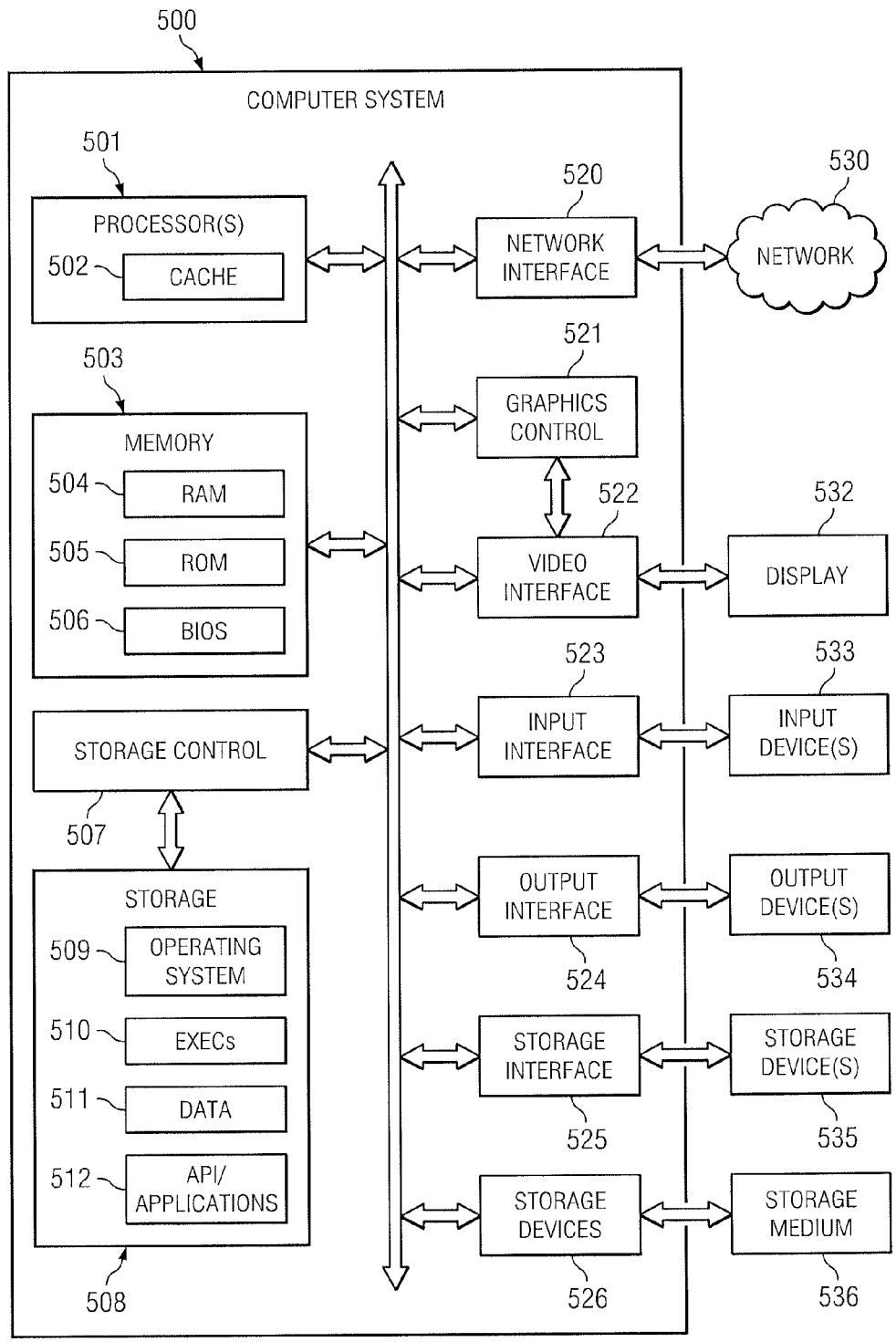
FIG. 5 illustrates an example computing system.

Validation toolkit 102 may include one or more software components residing at one or more computer systems. FIG. 5 illustrates an example computer system 500. Validation toolkit 102 and model generator 110 may be software components at one or more computer systems, which may be similar to example computer system 500. Particular embodiments may implement validation toolkit 102, model generator 110, or both as hardware, software, or a combination of hardware and software. As an example and not by way of limitation, one or more computer systems may execute particular logic or software to perform one or more steps of one or more processes described or illustrated with respect to validation toolkit 102, model generator 110, or both. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

The components in FIG. 5 are examples only and do not limit the scope of use or functionality of any hardware, software, embedded logic component, or a combination of two or more such components implementing particular embodiments. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 500 includes a display 532, one or more input devices 533 (which may, for example, include a keypad, a keyboard, a mouse, a stylus, etc.), one or more output devices 534 (which may, for example, include one or more speakers), one or more storage devices 535, and various storage media 536.

Bus 540 connects a wide variety of subsystems. Herein, reference to a bus encompasses one or more digital signal lines serving a common function, where appropriate. Bus 540 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 501 (or central processing unit(s) (CPU(s))) optionally contains a cache memory unit 502 for temporary local storage of instructions, data, or computer addresses. Processor(s) 501 are coupled to storage devices including memory 503. Memory 503 includes random access memory (RAM) 504 and read-only memory (ROM) 505. ROM 505 may act to communicate data and instructions unidirectionally to processor(s) 501, and RAM 504 may act to communicate data and instructions bidirectionally with processor(s) 501. ROM 505 and RAM 504 may include any suitable computer-readable media described below. Fixed storage 508 is connected bidirectionally to processor(s) 501, optionally through storage control unit 507. Fixed storage 508 provides additional data storage capacity and may also include any suitable computer-readable media described below. Storage 508 may be used to store operating system 509, EXECs 510, data 511, application programs 512, and the like. Typically, storage 508 is a secondary storage medium (such as a hard disk) that is slower than primary storage. Information in storage 508 may, in appropriate cases, be incorporated as virtual memory in memory 503.

Processor(s) 501 is connected to multiple interfaces, such as graphics control 521, video interface 522, input interface 523, output interface 524, and storage interface 525. These interfaces are in turn connected to appropriate devices, as illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer systems, or other suitable I/O device or a combination of two or more such I/O devices. Processor(s) 501 may connect to another computer system or to telecommunications network 530 (which may include network 12) through network interface 520. With network interface 520, CPU 501 may communicate with network 530 in the course of performing one or more steps of one or more processes described or illustrated herein, according to particular needs. Moreover, one or more steps of one or more processes described or illustrated herein may execute solely at CPU 501. In addition or as an alternative, one or more steps of one or more processes described or illustrated herein may execute at multiple CPUs 501 that are remote from each other across network 530.

In particular embodiments, when computer system 500 is connected to network 530, computer system 500 may communicate with other devices connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530 and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Particular embodiments include storage with one or more computer-readable media encoding computer-executable code for carrying out computer-implemented operations. The media and computer-executable code may be specially designed or created for particular embodiments or well known and available to a person having ordinary skill in the art. Examples of computer-readable media include, but are not limited to, magnetic media (such as hard disks, floppy disks, and magnetic tape), optical media (such as CD-ROMs and holographic devices), magneto-optical media (such as floptical disks), and hardware devices specially configured to store and execute code, such as application-specific ICs (ASICs), programmable logic devices (PLDs), and ROM and RAM devices. Examples of computer-code include machine code, such as code produced by a compiler, and files containing higher-level code that a computer may execute with an interpreter.

Computer system 500 may provide functionality as a result of processor(s) 501 executing software embodied in one or more computer-readable storage media, such as memory 503. Memory 503 may store software that implements particular embodiments, and processor(s) 501 may execute the software. Memory 503 may read the software from one or more other computer-readable media (such as mass storage device(s) 535) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In addition or as an alternative, computer system 500 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    accessing, by one or more computer systems, a dynamic web application that comprises a client tier;
    crawling, by the one or more computer systems, the dynamic web application, the crawling comprising one or more instances of guided crawling that each initiate when a preceding instance of automatic crawling reaches a state in the dynamic web application that meets one or more predetermined criteria for the instance of guided crawling and, when initiated, crawling the dynamic web application by performing one or more predetermined actions of crawling on the dynamic web application from the state in the dynamic web application reached during automatic crawling of the dynamic web application that led to initiation of the one or more instances of guided crawling before proceeding with another instance of automatic crawling;
    generating, by the one or more computer systems, based on the crawling, a screen transition model of the dynamic web application, the screen transition model comprising a hierarchical finite state machine (FSM); and
    after the generation of the screen transition model has completed, performing, by the one or more computer systems, model checking on the screen transition model to validate the client tier of the dynamic web application.

2. The method of claim 1, wherein the dynamic web application comprises one or more of Hyper Text Markup Language (HTML) content, Extensible Markup Language (XML) content, or JavaScript resources.

3. The method of claim 1, wherein the dynamic web application is configured to utilize Asynchronous JavaScript and XML (AJAX) during initialization or execution of the dynamic web application.

4. The method of claim 1, wherein:
    the dynamic web application comprises one or more executable code segments embedded in the dynamic web application; and
    the crawling comprises executing the one or more executable code segments.

5. The method of claim 1, wherein:
    the dynamic web application comprises one or more web pages; and
    crawling the dynamic web application comprises, for each of one or more of the web pages:
        receiving content for rendering the web page;
        translating the content into a document object model (DOM) representation of the web page; and
        crawling the DOM representation of the web page.

6. The method of claim 5, wherein:
    translating the content into a DOM representation for a current one of the web page comprises:
        receiving a DOM representation of a previous one of the web pages of the dynamic web application; and
        modifying the DOM representation of the previous one of the web pages to incorporate one or more differences between the current one of the web pages and the previous one of the web pages; and
    generating a screen transition model of the dynamic web application comprises:
        generating the screen transition model based on one or more of the differences between the DOM representations of the current one of the web pages and the previous one of the web pages.

7. The method of claim 1, wherein:
    a state in the dynamic web application that meets one or more predetermined criteria for the instance of guided crawling comprises a state corresponding to a particular web page of the dynamic web application that comprises one or more user interaction modules for receiving input from a user; and
    crawling the dynamic web application comprises entering one or more inputs to simulate interaction with one or more of the one or more user interaction modules.

8. The method of claim 7, wherein the one or more inputs are generated automatically through analysis of a DOM representation of the particular web page.

9. The method of claim 1, wherein performing model checking on the screen transition model comprises testing whether the screen transition model satisfies a predetermined specification for the dynamic web application.

10. The method of claim 9, wherein testing whether the screen transition model satisfies the predetermined specification for the dynamic web application comprises:
determining whether the screen transition model satisfies one or more functional properties specified in the specification; and
determining whether the screen transition model satisfies one or more navigational properties related to the usability of the dynamic web application specified in the specification.

11. One or more non-transitory computer-readable tangible storage media encoding software that is operable when executed to:
access a dynamic web application that comprises a client tier;
crawl the dynamic web application, wherein in order to crawl the dynamic web application, the software is operable when executed to perform one or more instances of guided crawling that each initiate when a preceding instance of automatic crawling reaches a state in the dynamic web application that meets one or more predetermined criteria for the instance of guided crawling and, when initiated, crawling the dynamic web application by performing one or more predetermined actions of crawling on the dynamic web application from the state in the dynamic web application reached during automatic crawling of the dynamic web application that led to initiation of the one or more instances of guided crawling before proceeding with another instance of automatic crawling;
generate based on the crawling, a screen transition model of the dynamic web application, the screen transition model comprising a hierarchical finite state machine (FSM); and
after the generation of the screen transition model has completed, perform model checking on the screen transition model to validate the client tier of the dynamic web application.

12. The media of claim 11, wherein the dynamic web application comprises one or more of Hyper Text Markup Language (HTML) content, Extensible Markup Language (XML) content, or JavaScript resources.

13. The media of claim 11, wherein the dynamic web application is configured to utilize Asynchronous JavaScript and XML (AJAX) during initialization or execution of the dynamic web application.

14. The media of claim 11, wherein:
the dynamic web application comprises one or more executable code segments embedded in the dynamic web application; and
the software operable when executed to crawl the dynamic web application comprises software operable when executed to execute the one or more executable code segments.

15. The media of claim 11, wherein:
the dynamic web application comprises one or more web pages; and
the software operable when executed to crawl the dynamic web application comprises software operable when executed to, for each of one or more of the web pages:
receive content for rendering the web page;
translate the content into a document object model (DOM) representation of the web page; and
crawl the DOM representation of the web page.

16. The media of claim 15, wherein:
the software operable when executed to translate the content into a DOM representation for a current one of the web pages comprises software operable when executed to:
receive a DOM representation of a previous one of the web pages of the dynamic web application; and
modify the DOM representation of the previous one of the web pages to incorporate one or more differences between the current one of the web pages and the previous one of the web pages; and
the software operable when executed to generate a screen transition model of the dynamic web application comprises software operable when executed to:
generate the screen transition model based on one or more of the differences between the DOM representations of the current one of the web pages and a previous one of the web pages.

17. The media of claim 11, wherein:
a state in the dynamic web application that meets one or more predetermined criteria for the instance of guided crawling comprises a state corresponding to a particular web page of the dynamic web application that comprises one or more user interaction modules for receiving input from a user; and
the software operable when executed to crawl the dynamic web application comprises software operable when executed to enter one or more inputs to simulate interaction with one or more of the one or more user interaction modules.

18. The media of claim 17, wherein the software is further operable to automatically generate the one or more inputs through analysis of a DOM representation of the particular web page.

19. The media of claim 11, wherein the software operable when executed to perform model checking on the screen transition model comprises software operable when executed to test whether the screen transition model satisfies a predetermined specification for the dynamic web application.

20. The media of claim 19, wherein the software operable when executed to test whether the screen transition model satisfies the predetermined specification for the dynamic web application comprises software operable when executed to:
determine whether the screen transition model satisfies one or more functional properties specified in the specification; and
determine whether the screen transition model satisfies one or more navigational properties related to the usability of the dynamic web application specified in the specification.

* * * * *